United States Patent Office 3,504,089
Patented Mar. 31, 1970

---

3,504,089
3,4,5-TRIARYLCYCLOHEXYLAMINE COMPOSITIONS
Michael Mullen Robison, Watchung, N.J., assignor to Ciba Corporation, New York, N.Y., a corporation of Delaware
No Drawing. Continuation-in-part of application Ser. No. 549,180, May 11, 1966. This application Apr. 20, 1967, Ser. No. 632,215
Int. Cl. A61k 27/00
U.S. Cl. 424—246    3 Claims

ABSTRACT OF THE DISCLOSURE

Pharmaceutical compositions comprising essentially:

(1) a 3,4,5-triaryl-cyclohexylamine,
(2) a 3,4 - dihydro - 1,2,4 - benzothiadiazine-1,1-dioxide and, if desired,
(3) a hypotensive agent, are useful diuretics.

CROSS-REFERENCES TO RELATED APPLICATIONS

This is a continuation-in-part of application Ser. No. 549,180, filed May 11, 1966 and now U.S. Patent No. 3,455,944.

SUMMARY OF THE INVENTION

The present invention concerns and has for its object the provision of pharmaceutical compositions, useful as diuretics and for the treatment of hypertension, containing essentially the compounds listed above under items (1), (2) and (3), methods for their preparation, as well as a method of treatment of edema, congestive heart failure and hypertension with the use of said compositions.

DESCRIPTION OF THE PREFERRED EMBODIMENTS

The 3,4,5-triaryl-cyclohexylamines used in the invention are those described in the above-mentioned copending application, preferably those of the Formula I

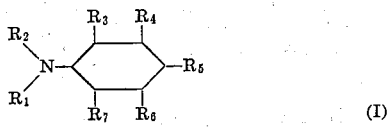

in which each of $R_1$ and $R_2$ stands for alkyl with up to 4 carbon atoms or $R_1$ and $R_2$ taken together stand for 1,4-butylene, 1,5-pentylene, 3-oxa- or 3-thia-pentylene-(1,5) or 3-methyl- or 3-ethyl-3-aza-pentylene-(1,5), each of $R_3$ and $R_7$ stands for hydrogen or methyl, each of $R_4$ and $R_6$ stands for phenyl, lower alkyl-phenyl, lower alkoxy-phenyl, halophenyl, trifluoromethyl-phenyl or di-lower alkylamino-phenyl and $R_5$ stands for pyridyl or lower alkyl-pyridyl and therapeutically useful acid addition salts thereof.

Above all, the compounds mentioned under item (1) are those of the Formula II

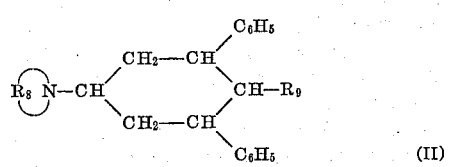

in which $R_8$ stands for 1,4-butylene, 1,5-pentylene, 3-oxa- or 3-thia-pentylene-(1,5) or 3-methyl- or 3-ethyl-3-aza-pentylene-(1,5) and $R_9$ stands for pyridyl-(2), pyridyl-(3) or pyridyl-(4) and therapeutically useful acid addition salts thereof.

The above-mentioned 3,4,5 - triaryl-cyclohexylamines are in the form of the various geometrical isomers (epimers), of which the 1α-amino-3β, 4α, 5β-triaryl-cyclohexanes are the preferred epimers.

Special mention deserve the 1α-pyrrolidino-3β, 5β-diphenyl-4α-(2 - pyridyl)-cyclohexane and therapeutically useful acid addition salts thereof, more particularly the citrate thereof.

The 3,4 - dihydro-1,2,4-benzothiadiazine-1,1-dioxides used in the invention are preferably those described in U.S. Patents Nos. 2,163,644 and 3,163,645, more particularly those of the Formula III

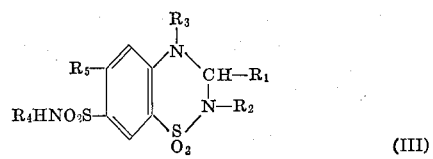

in which $R_1$ stands for hydrogen, lower alkyl, lower alkenyl, cycloalkyl and cycloalkyl-lower alkyl with 3 to 6 ring-carbon atoms, cycloalkenyl and cycloalkenyl-lower alkyl with 5 to 6 ring-carbon atoms, halogeno-lower alkyl, di-lower alkylamino-lower alkyl, lower alkanoyl-lower alkyl, lower alkoxy-lower alkyl, halogeno-lower alkoxy-lower alkyl, monocyclic carbocyclic aryloxy-lower alkyl, lower alkylmercapto-lower alkyl, halogeno-lower alkyl-mercapto-lower alkyl, monocyclic aryl-mercapto-lower alkyl, monocyclic aryl-lower alkylmercapto-lower alkyl, monocyclic carbocyclic aryl or aryl-lower alkyl, $R_2$, $R_3$ and $R_4$ each for hydrogen or lower alkyl and $R_5$ for halogen, lower alkyl or halogeno-lower alkyl and therapeutically useful alkali metal salts thereof.

Above all, the compounds mentioned under time (2) are the 6-chloro- or 6-trifluoromethyl-7-sulfamyl-2H-3,4-dihydro-1,2,4-benzothiadiazine-1,1-dioxide and their 3-n-butyl, 3-isobutyl, 3-(2-methyl-propyl), 3-(2-ethylmercaptomethyl), 3-dichloromethyl, 3-benzyl, 3-(α-methylbenzyl), 3-(2-phenyl-ethyl), 3-cyclopentyl, 3-cyclohexyl, 3-(3-cyclohexenyl), 3-cyclopropylmethyl, 3 - cyclobutylmethyl, 3 - cyclopentylmethyl, 3-(2-cyclopentyl-ethyl), 3-(1-cyclopentyl-ethyl), 3-(5-norbornen-2-yl) and 3-thenyl derivatives as well as their 2-ethyl, 2-allyl, 2-n-propyl, 2-benzyl and 2-(2-pyranyl) derivatives and their 2-methyl-3 - chloromethyl, 2 - methyl-3-(2,2,2-trifluoroethylmercapto-methyl), 2-ethyl-3-dichloromethyl, 2-benzyl-3-chloromethyl and 2,7 - bis-n-butylcarbamyl-3-chloromethyl derivatives.

If desired, the compositions of the invention may contain hypotensive agents, such as those described in (a) U.S. Patent No. 2,928,829, preferably 2-heptamethyleneiminoethylguanidine hemisulfate, or
(b) U.S. Patents Nos. 2,484,029 and 2,484,785, more particularly those of Formula IV

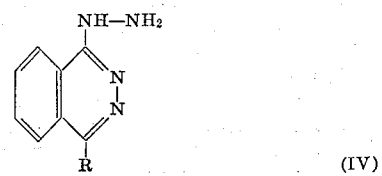

in which R stands for hydrogen, methyl or hydrazino and pharmacologically acceptable acid addition salts thereof, preferably the hydrochlorides, sulfates or methane sulfonates thereof, or (c) U.S. Patents Nos. 2,752,351, 2,813,871, 2,833,711 and 2,876,228, more particularly those of Formula V

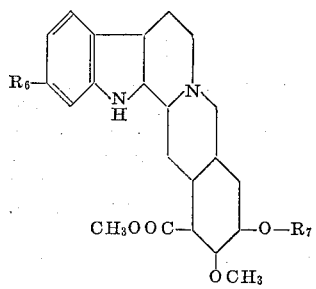

in which $R_6$ stands for hydrogen or methoxy and $R_7$ for 3,4,5-trimethoxy-benzoyl or -cinnamoyl, or 3,5-dimethoxy-4-carbethoxy-benzoyl, and pharmacologically acceptable acid addition salts thereof, preferably reserpine, deserpidine or rescinnamine, or (d) any other useful antihypertensive agent, such as 2-(2-dimethylamino-ethyl) - 4,5,6,7 - tetrachloro-isoindoline dimethochloride, 1,3-dicarbamoyl-2-methyl-2-sec. butyl-propane, N, 2, 3, 3-tetramethyl-2- norbornamine hydrochloride, 1 - 3 - (3,4-dihydroxy-phenyl)-2-methylalanine, N-methyl-N-(2-propynyl)-benzylamine hydrochloride, d-3-(3-dimethylamino-propyl)-1,8,8-trimethyl-3-aza-bicyclo [3,2,1] octane dimethomethanesulfonate, protovertatrine A and the like.

The 3,4,5-triaryl-cyclohexylamine mentioned under item (1) exhibit diuretic activity with negligible effects on potassium excretion. The 3,4-dihydro-1,2,4-benzothiadiazine-1,1-dioxide diuretics mentioned under item (2), however, are causing in some situations hypokalemia. Surprisingly, it has been found, that said 3,4,5-triaryl-cyclohexylamines, when given together with said 3,4-dihydro-1,2,4-benzothiadiazine-1,1-dioxides, decrease the undesired kaliuretic effects of the latter. This can be demonstrated in animal tests, using for example mammals, e.g. rats or dogs, as test objects. In general, the larger the kaliuretic response induced, for example, by 6-chloro-7-sulfamyl - 3,4 - dihydro-2H-1,2,4-benzothiadiazine-1,1-dioxide, advantageously at oral doses increasing from about 0.3 to about 1.3 mg./kg. in dogs, the greater is the inhibition of this response induced, for example, by the oral dose of about 5 mg./kg. of 1α-pyrrolidino-3β, 5β-diphenyl-4α-(2-pyridyl)-cyclohexane or its citrate. While the compounds mentioned under item (1) decrease the kaliuretic response of the compounds mentioned under item (2), they produce an almost additive effect on the diuretic, natriuretic and chloruretic effects obtained by the latter. Accordingly, the compositions of the invention show superiority over the 3,4,5-triaryl-cyclohexylamines, inter alia with regard to their diuretic effects, as well as over the 3,4-dihydro-1,2,4-benzothiadiazine-1,1-dioxides, inter alia with regard to their undesired kaliuretic effects.

In the preparation of the compositions according to the invention, one may desirably use therein about 10 to about 90% of the amount known and used for the diuretics mentioned under item (2) together with about half of their amount up to about 500 times of their amount of the diuretics mentioned under item (1).

Orally applicable compositions, such as tablets, pills or capsules, may be compounded to contain about 1 to 100 mg., more particularly about 1 to 50 mg. of the 3,4-dihydro-1,2,4-benzothiadiazine-1,1-dioxides and about 10 to 500 mg., more particularly about 20 to 200 mg. of the 3,4,5-triarylcyclohexylamines.

Especially valuable are compositions that contain per oral unit doses about 25 to 200 mg. 1α-pyrrolidino-3β, 5β-diphenyl-4α,(2-pyridyl)-cyclohexane or preferably its citrate, together with about:

(a) to 50 mg. 6-chloro-7-sulfamyl-2H-3,4-dihydro-1,2,4-benzothiadiazine-1,1-dioxide, or
(b) 10 to 50 mg. 6-trifluoromethyl-7-sulfamyl-2H-3,4-dihydro-1,2,4-benzothiadiazine-1,1-dioxide, or
(c) 0.1 to 0.5 mg. 3-cyclopentylmethyl-6-chloro-7-sulfamyl-2H-3,4-dihydro-1,2,4-benzothiadiazine-1,1-dioxide, or
(d) 1.0 to 5.0 mg. 3-(5-norbornenyl-2)-6-chloro-7-sulfamyl-2H-3,4-dihydro-1,2,4-benzothiadiazine-1,1-dioxide, or
(e) 1.0 to 5.0 mg. 2-methyl-3-chloromethyl-6-chloro-7-sulfamyl-2H-3,4-dihydro-1,2,4-benzothiadiazine-1,1-dioxide, or
(f) 1.0 to 5.0 mg. 3-dichloromethyl-6-chloro-7-sulfamyl-2H-3,4-dihydro-1,2,4-benzothiadiazine-1,1-dioxide, or
(g) 1.0 to 5.0 mg. 3-benzyl-6-trifluoromethyl-7-sulfamyl-2H-3,4-dihydro-1,2,4-benzothiadiazine-1,1-dioxide, or
(h) 1.0 to 5.0 mg. 2-methyl-3-(2,2,2-trifluoromethylmercaptomethyl)-6-chloro-7-sulfamyl-2H-3,4-dihydro-1,2,4-benzothiadiazine-1,1-dioxide.

These compositions may contain the following additional hypotensive ingredients:
(a) together with about 10 to 50 mg. 1-hydrazino-phthalazine hydrochloride,
(a) together with about 0.3 to 1.5 mg. syrosingopine,
(a) together with about 10 to 50 mg. 3-(3-oxo-7α-acetylthio-17β-hydroxy-4-androsten-17α-yl)propionic acid-γ-lactone,
(a) together with about 100 to 500 mg. 2-methyl-2-propyl-1,3-propanediol dicarbamate,
(a) together with about 0.1 to 0.5 mg. reserpine or deserpidine,
(a) together with about 0.1 to 0.5 mg. reserpine and 5.0 to 25 mg. 1,4-dihydrazino-phthalazine,
(a) together with about 0.1 to 0.5 mg. reserpine and 10 to 50 mg. 1-hydrazino-phthalazine,
(a) together with about 0.1 to 0.5 mg. reserpine and about 10 to 50 mg. sodium 5-sec.-butyl-5-ethyl-barbiturate,
(b) together with about 0.1 to 0.5 mg. reserpine and about 0.1 to 0.5 mg. protoveratrine A,
(c) together with about 5 to 25 mg. 2-heptamethylene-iminoethylguanidine hemisulfate,
(d) together with about 0.1 to 0.5 mg. reserpine,
(e) together with about 0.1 to 0.5 mg. reserpine and 1.0 to 5.0 mg. veratrum viride tennate,
(f) together with about 0.1 to 0.5 mg. reserpine,
(h) together with about 0.1 to 0.5 mg. reserpine.

The above compositions may be administered according to the particular need, preferably 1 to 3 times a day.

The formation of the compositions of this invention, which may be, for example, tablets, pills, dragees or capsules, is carried out in the manner normally employed in the art, usually by combining the active ingredients mentioned under (1), (2) and (3) with pharmaceutically acceptable inorganic or organic excipients suitable especially for enteral administration. These include carriers, binders, fillers, lubricants, stabilizers, preservants, wetting agents, solution promoters or retarders, salts for regulating the osmotic pressure, buffers, colors and the like. Examples of such carrier materials are starches, e.g. corn starch, wheat starch, arrowroot starch and the like, sugars, e.g. lactose, sucrose and the like, stearic acid or salts thereof, e.g. magnesium stearate, calcium stearate and the like, aluminum magnesium silicate preparations (colloidal silica preparations), basic aluminum salts, e.g. aluminum dihydroxyallantoinate, talcum, tragacanth, acacia, polyethylene glycol and the like. The quantities of these ingredients may vary widely and depend upon the physical characteristics (e.g. softness and the like) and size of the orally applicable composition, the method of its manufacture and the like. Encapsulation may also be effected using, if necessary, the same excipients as those employed for the manufacturing of the tablets. Any compatible color, approved and certified under the provision of the Federal Food, Drug and Cosmetic Law may be used as a means of identification and the like.

The tablet, capsule or pill for oral use may be enterically coated and such coating is effected in the standard manner, using standard enteric coating agents. Thus, agents, such as gelatin (alone or hardened with formaldehyde), cellulose esters and ethers, shellac, fats or fatty acids containing a disintegrating solid, such as magnesium oxide or other standard enteric coating materials, may be used. Preferably, one may utilize cellulose esters or ester-ethers, such as those described in United States Patent No. 2,196,768, as well as the procedure described therein. Other coating materials and procedures useful in the invention are those, for example, described in the United States Patents Nos. 2,071,511 and 2,205,111. Particularly satisfactory enteric coating materials are those described in the United States Patent No. 2,196,768, page 1, right-hand column, line 21, through page 2, left-hand column, line 2.

The compositions of the invention may also provide for a prolonged and sustained effect. For example, tablets, such as those described in United States Patent No. 2,887,738, may contain the pharmacologically active ingredient embedded in a pharmaceutically acceptable waxy core (for prolonged absorption in the lower intestine), around which is compressed a granulated mixture of the active ingredient together with a pharmaceutically acceptable carrier (for immediate absorption in the stomach). Or, capsules having prolonged effects may contain micro-pills containing small amounts of the pharmacologically active ingredient with coats of different rates of degradation. These long-acting preparations are prepared according to well-known methods.

Following are working examples, illustrative of, but in no way intended to limit the present invention. Unless otherwise indicated, all parts, wherever given in the specification, are parts by weight.

EXAMPLE 1

1000 tablets each containing 75 mg. of two active ingredients:

| Formula: | G. |
|---|---|
| 1α-pyrrolidino-3β,5β-diphenyl-4α-(2-pyridyl)-cyclohexane citrate | 25.0 |
| 6-chloro-7-sulfamyl-2H-3,4-dihydro-1,2,4-benzothiadiazine-1,1-dioxide | 50.0 |
| Corn starch | 10.0 |
| Lactose | 74.0 |
| Magnesium stearate | 1.0 |
| Polyethylene glycol 6000 | 10.0 |
| Sucrose syrup | 20.0 |
| Talc | 10.0 |

Procedure

The starch, lactose, stearate and talc are passed through a screen with 1.2 mm. opening and mixed well. The citrate and benzothiadiazine, previously mixed with a portion of lactose and passed through the same screen, are added and the whole is blended for 20 minutes in a low speed mixer. The syrup and molten glycol are mixed at 70° and the mixture added to the powders to allow granulate for 30 minutes. The granulate is passed through a comminuting machine using a screen with 4.0 mm. opening and dried at room temperature overnight with circulating air. The dry granulate is passed through a comminuting machine using a screen with 1.4 mm. opening and compressed into 200 mg. tablets using 7.9 mm. dies and flat beveled punches. The disintegration time of said tablets is about 30 minutes.

EXAMPLE 2

10,000 tablets each containing 100.5 mg. of 2 active ingredients:

| Formula: | G. |
|---|---|
| 1α-pyrrolidino-3β,5β-diphenyl-4α-(2-pyridyl)-cyclohexane citrate | 1,000.0 |
| 3-cyclophentylmethyl-6-chloro-7-sulfamyl-2H-3,4-dihydro-1,2,4-benzothiadiazine-1,1-dioxide | 5.0 |
| Lactose | 2,535.0 |
| Talcum powder | 150.0 |
| Magnesium stearate | 40.0 |
| Corn starch | 125.0 |
| Polyethylene glycol 6,000 | 150.0 |
| Purified water, q.s. | |

Procedure

All the powders are passed through a screen with an opening of 0.6 mm. Then the drug substance, lactose, talcum, magnesium stearate and ½ of the starch are mixed in a suitable mixer. The other ½ of the starch is suspended in 50 ml. water and the suspension added to the hot solution of the polyethylene glycol in 180 ml. water. The paste formed is added to the powders, which are granulated, if necessary, with an additional amount of water. The granulate is dried overnight at 35°, broken on a screen with 1.2 mm. opening and compressed into tablets using concave punches with 10.3 mm. diameter, uppers bisected.

EXAMPLE 3

10,000 tablets each containing 100 mg. of 3 active ingredients:

| Formula: | G. |
|---|---|
| 1α-pyrrolidino-3β,5β-diphenyl-4α-(2-pyridyl)-cyclohexane citrate | 850.0 |
| 6-chloro-7-sulfamyl-2H-3,4-dihydro-1,2,4-benzothiadiazine-1,1-dioxide | 100.0 |
| 2-heptamethyleneimino-ethylguanidine hemisulfate | 50.0 |
| Lactose | 2,535.0 |
| Talcum powder | 150.0 |
| Magnesium stearate | 40.0 |
| Corn starch | 125.0 |
| Polyethylene Glycol 6,000 | 150.0 |
| Purified water, q.s. | |

Procedure

All the powders are passed through a screen with an opening of 0.6 mm. Then the drug substance, lactose, talcum, magnesium stearate and ½ of the starch are mixed in a suitable mixer. The other ½ of the starch is suspended in 50 ml. water and the suspension added to the hot solution of the polyethylene glycol in 180 ml. water. The paste formed is added to the powders, which are granulated, if necessary, with an additional amount of water. The granulate is dried overnight at 35°, broken on a screen with 1.2 mm. opening and compressed into tablets using concave punches with 10.3 mm. diameter, uppers bisected.

EXAMPLE 4

10,000 tablets each containing 100 mg. of 4 active ingredients:

| Formula: | G. |
|---|---|
| 1α-pyrrolidino-3β,5β-diphenyl-4α-(2-pyridyl)-cyclohexane citrate | 819.0 |
| 6-chloro-7-sulfamyl-2H-3,4-dihydro-1,2,4-benzothiadiazine-1,1-dioxide | 80.0 |
| 1,4-dihydrazino phthalazine | 100.0 |
| Reserpine | 1.0 |
| Lactose | 2,535.0 |
| Talcum powder | 150.0 |
| Magnesium stearate | 40.0 |
| Corn starch | 125.0 |
| Polyethylene Glycol 6,000 | 150.0 |
| Purified water, q.s. | |

7

Procedure

As described in Example 2.

EXAMPLE 5

10,000 tablets each containing 100.15 mg. of 3 active ingredients:

| Formula: | G. |
|---|---|
| 1α - pyrrolidino - 3β,5β - diphenyl - 4α - (2-pyridyl)-cyclohexane citrate | 900.0 |
| 6 - chloro - 7-sulfamyl-2H-3,4-dihydro-1,2,4-benzothiadiazine-1,1-dioxide | 100.0 |
| Reserpine | 1.5 |
| Lactose | 2,535.0 |
| Talcum powder | 150.0 |
| Magnesium stearate | 40.0 |
| Corn starch | 125.0 |
| Polyethylene Glycol 6,000 | 150.0 |
| Purified water, q.s. | |

Procedure

As described in Example 2.

EXAMPLE 6

10,000 capsules each containing 150 mg. of 2 active ingredients:

| Formula: | G. |
|---|---|
| 1α - pyrrolidino -3β,5β - diphenyl - 4α - (2-pyridyl)-cyclohexane citrate | 1,200.0 |
| 6 - trifluoromethyl - 7-sulfamyl-2H-3,4-dihydro-1,2,4-benzothiadiazine-1,1-dioxide | 300.0 |
| Lactose | 2,800.0 |
| Talcum powder | 200.0 |

Procedure

All the powders are passed through a screen with an opening of 0.6 mm. Then the drug substance and the talcum are mixed slowly, whereupon the lactose is added portionwise and mixing is continued until homogeneous. The mixture is distributed into 10,000 capsules of appropriate size using a corresponding filling machine.

EXAMPLE 7

10,000 capsules each containing 50.2 mg. of 3 active ingredients:

| Formula: | G. |
|---|---|
| 1α - pyrrolidino - 3β,5β - diphenyl - 4α - (2-pyridyl)-cyclohexane citrate | 500.0 |
| 3 - cyclopentylmethyl-7-sulfamyl-2H-3,4-dihydro-1,2,4-benzothiadiazine-1,1-dioxide | 1.0 |
| Syrosingopine | 1.0 |
| Lactose | 2,348.0 |
| Talcum powder | 150.0 |

Procedure

As described in Example 6.

In the analogous manner, tablets or capsules are prepared using about 25 to 200 mg. 1α-pyrrolidino-3β,5β-diphenyl-4α-(2-pyridyl)-cyclohexane citrate together with the compounds listed in Col. 4.

I claim:

1. A pharmaceutical composition in oral dosage unit form, comprising (a) about 10 to about 90% of the amount used of a 3,4-dihydro-1,2,4-benzothiadiazine-1,1-dioxide diuretic together with (b) about half to about 500 times of this amount of a compound having the formula

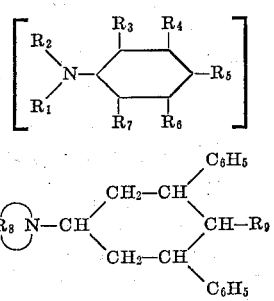

in which $R_8$ stands for 1,4-butylene, 1,5-pentylene, 3-oxa-pentylene-(1,5), 3-thia-pentylene-(1,5), 3-methyl-3-aza-pentylene - (1,5) or 3 - ethyl - 3 - aza-pentylene-(1,5) and $R_9$ stands for pyridyl-(2), pyridyl-(3) or pyridyl-(4) or a therapeutically useful acid addition salt thereof.

2. A composition as claimed in claim 1, comprising per oral unit dose about 25 to 200 mg. 1α-pyrrolidino-3β,5β-diphenyl-4α-(2-pyridyl)-cyclohexane or its citrate acid addition salt, together with about:
   (a) 10 to 50 mg. 6-chloro-7-sulfamyl-2H-3,4-dihydro-1,2,4-benzothiadiazine-1,1-dioxide, or
   (b) 10 to 50 mg. 6-trifluoromethyl-7-sulfamyl-2H-3,4-dihydro-1,2,4-benzothiadiazine-1,1-dioxide, or
   (c) 0.1 to 0.5 mg. 3-cyclopentylmethyl-6-chloro-7-sulfamyl - 2H - 3,4 - dihydro - 1,2,4 - benzothiazine-1,1-dioxide.

3. A composition as claimed in claim 1, comprising per oral unit dose about 25 to about 100 mg. 1α-pyrrolidino-3β,5β-diphenyl-4α-(2-pyridyl)-cyclohexane and about 10 to 50 mg. 6-chloro-7-sulfamyl-2H-3,4-dihydro-1,2,4-benzothiadiazine-1,1-dioxide.

References Cited

UNITED STATES PATENTS 2,928,829  3/1960  Mull _____ 260—239
3,163,645  12/1964  Stevens et al. _____ 260—243

ALBERT T. MEYERS, Primary Examiner

D. M. STEPHENS, Assistant Examiner

U.S. Cl. X.R.

260—247.2, 295, 296; 424—330

CASE SU-423/1-3/COMP.

PO-1050
(5/69)

UNITED STATES PATENT OFFICE
CERTIFICATE OF CORRECTION

Patent No. 3,504,089   Dated March 31, 1970

Inventor(s) MICHAEL MULLEN ROBISON

It is certified that error appears in the above-identified patent and that said Letters Patent are hereby corrected as shown below:

Column 8, lines 10 through 15, delete the bracketed formula;

SIGNED AND
SEALED
NOV 24 1970

(SEAL)
Attest:

Edward M. Fletcher, Jr.
Attesting Officer

WILLIAM E. SCHUYLER, JR.
Commissioner of Patents